Jan. 23, 1940. C. S. BAKER Re. 21,329

COMPRESSOR REGULATOR

Original Filed Feb. 16, 1938 4 Sheets-Sheet 1

INVENTOR
Charles S. Baker
BY
HIS ATTORNEY.

Jan. 23, 1940. C. S. BAKER Re. 21,329

COMPRESSOR REGULATOR

Original Filed Feb. 16, 1938 4 Sheets-Sheet 2

INVENTOR
Charles S. Baker
BY
HIS ATTORNEY.

Jan. 23, 1940. C. S. BAKER Re. 21,329

COMPRESSOR REGULATOR

Original Filed Feb. 16, 1938 4 Sheets-Sheet 3

INVENTOR
Charles S. Baker.
BY
HIS ATTORNEY.

Jan. 23, 1940. C. S. BAKER Re. 21,329

COMPRESSOR REGULATOR

Original Filed Feb. 16, 1938 4 Sheets-Sheet 4

INVENTOR
Charles S. Baker.
BY
HIS ATTORNEY.

Reissued Jan. 23, 1940

Re. 21,329

UNITED STATES PATENT OFFICE 21,329

COMPRESSOR REGULATOR

Charles S. Baker, Corning, N. Y., assignor to Ingersoll-Rand Company, Jersey City, N. J., a corporation of New Jersey Original No. 2,171,286, dated August 29, 1939, Serial No. 190,799, February 16, 1938. Application for reissue November 22, 1939, Serial No. 305,681

35 Claims. (Cl. 230—4)

This invention relates to motor driven fluid compressors, and, more particularly, to apparatus to control the speed of the motor by the variations in the discharge pressure of the compressor and to maintain the compressor fully loaded until the speed of the motor has been reduced to a minimum.

A motor driven fluid compressor unit comprises a motor or engine, such as an internal combustion motor or steam engine, directly connected to drive a compressor which compresses a fluid and delivers it to a receiver tank where it is stored until used. Ordinarily, in order to prevent overloading of the receiver, regulator means are provided which, when the pressure in the receiver tank reaches a predetermined point, operates to prevent a further discharge of fluid to the receiver from the compressor (commonly termed "unloading") and, at the same time, reduces the speed of the motor to a minimum or idling speed. The compressor unit then idles until the pressure in the receiver tank falls to a predetermined minimum pressure whereupon the regulator operates to permit the compressor to discharge fluid to the receiver tank (commonly termed "reloading") and to accelerate the motor to its maximum operating speed.

The disadvantages of operating the compressor unit in this way are that the compressor will not run at a minimum speed at any time unless the compressor is completely unloaded, nor will it operate at any speed but the maximum speed when the compressor is loaded.

It is, accordingly, an object of the present invention to provide means whereby the speed of the motor of a compressor unit may be controlled by variation in the discharge pressure of the compressor.

It is another object of the invention to provide means whereby a motor driven compressor unit may operate at its minimum speed without unloading.

It is a further object to provide means in a compressor unit whereby the compressor may be gradually unloaded in accordance with a gradual rise in the discharge pressure of the compressor after a predetermined high discharge pressure of the compressor is reached.

Still another object is to provide means in a compressor unit whereby the degree of unloading or reloading of the compressor is dependent on the discharge pressure of the compressor.

A further object is to provide a device in a compressor unit whereby the motor speed is held at a minimum during unloading and reloading of the compressor.

Still another object is to provide a device in a compressor unit whereby the motor may accelerate or decelerate between the maximum and the minimum speeds of the motor before the compressor begins to unload.

Another object is to provide a compressor unit with a device whereby the motor may be accelerated and decelerated between its maximum and minimum speeds until the compressor discharge pressure reaches a predetermined high pressure and thereafter remain at its minimum speed until a predetermined minimum discharge pressure is reached.

Figure 1:
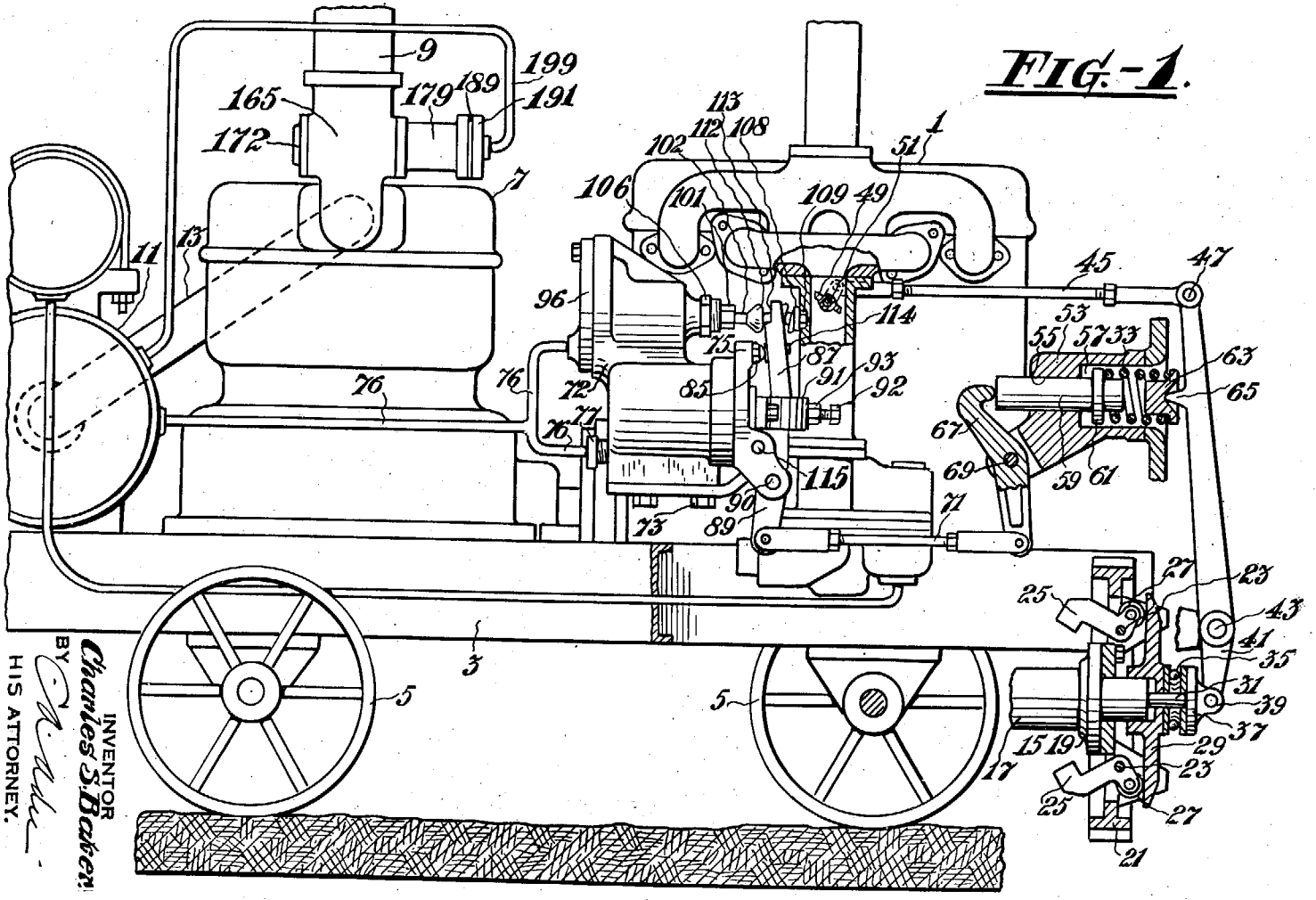
Figure 2:
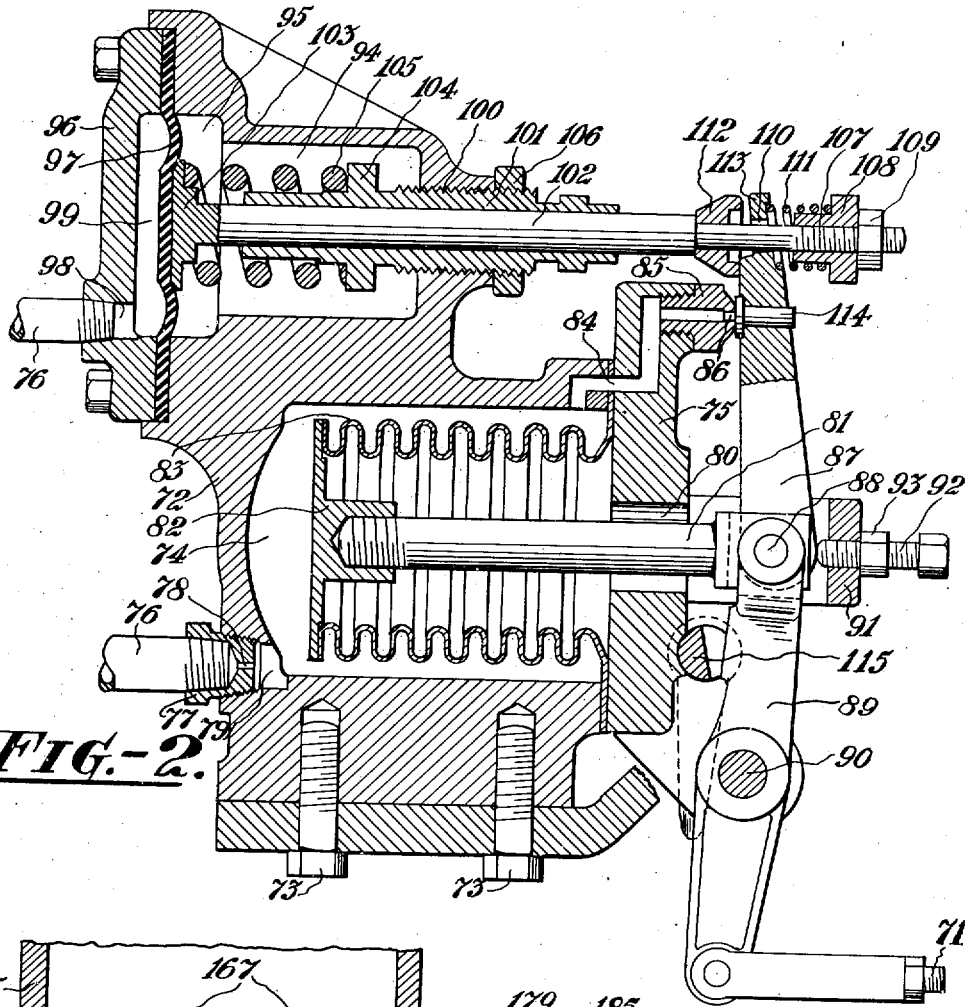

These and further objects will be readily apparent from the following description of which the drawings, in which similar numerals indicate like parts, form a part and in which Figure 1 is a view partly in elevation and partly in section illustrating the application of the present invention to a compressor unit. A portion of the governor regulator and the governor is increased in size in order that the details may be brought out more clearly, Figure 2 is a view partially in elevation and partially in section of the governor regulating portion of the regulator constructed in accordance with the principles of this invention, and Figure 3 is a view similar to Figure 1 illustrating the application of a modification of the present invention to a compressor unit.

Figure 5:
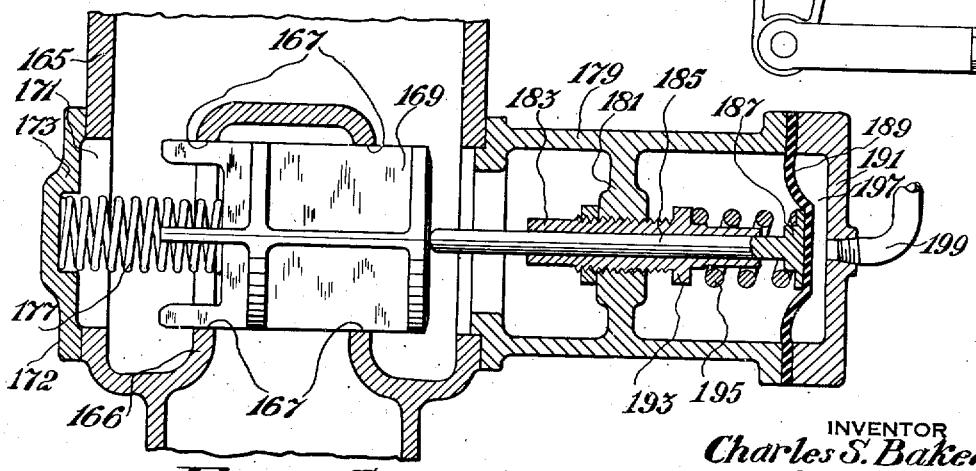
Figure 3:
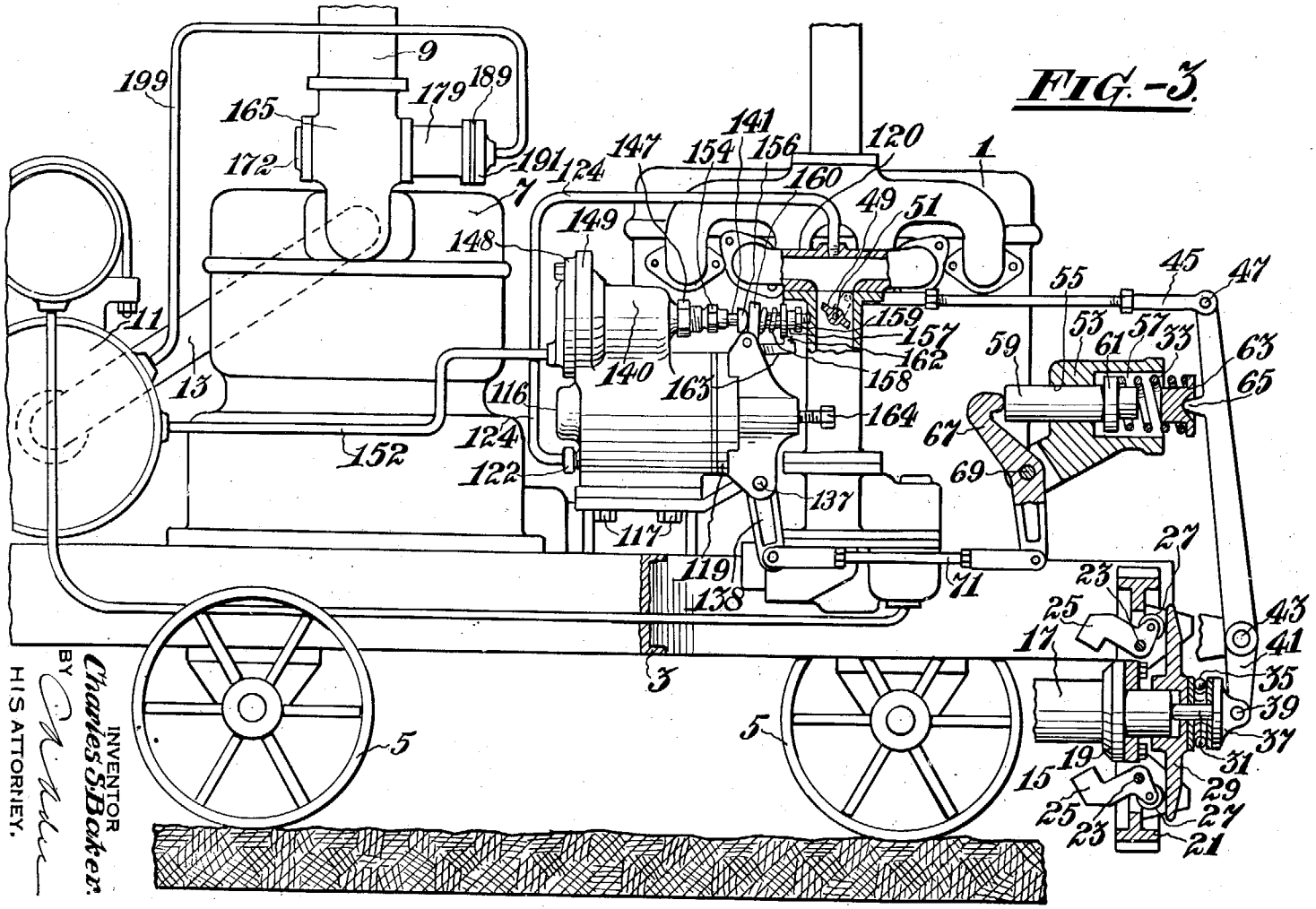
Figure 4:
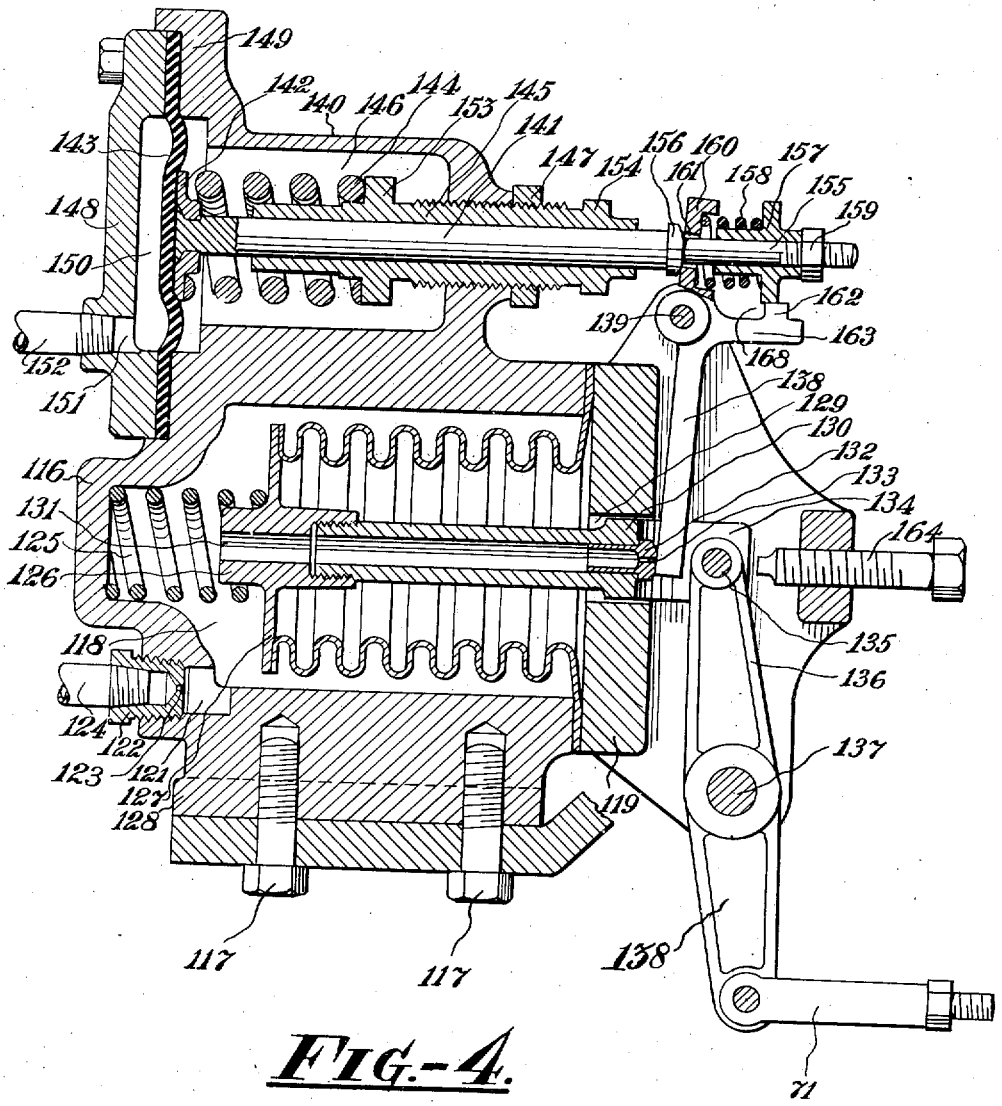

Figure 4 is a sectional view of the governor regulator illustrated in Figure 3, and Figure 5 is a view in section of the load regulating portion of the compressor unit shown in Figures 1 and 3.

With reference to Figs. 1 and 3, the compressor unit consists of an internal combustion motor 1, mounted on a frame 3, supported by wheels 5, and directly connected to drive the fluid compressor 7, which is likewise mounted on the frame 3. Fluid is delivered to the compressor 7 through a conduit 9 and delivered from the compressor to a receiver tank 11 by the conduit 13.

The speed of the motor 1 is controlled by a governor generally indicated at 15, having a shaft 17 directly connected to the shaft of the motor 1 (not shown). The shaft 17 has a flange 19 to which is secured a gear 21. Fulcrumed at 23, on the gear 21, are weights 25 which carry rollers 27.

Accordingly, when the weights move outwardly against the force of the governor spring 33, the motion of the plate 29 is transmitted through the anti-friction bearing 35 to a plate 37 formed integral with pin 31 coaxial with and slidably mounted on the shaft 17. The plate 37, through the clevis 39 and a lever 41, fulcrumed on the frame of the motor at 43, transmits motion to a link 45 rotatably connected to the lever 41, by pin 47 at the end opposite to that at which the clevis 39 is secured. This tie-rod or link 45 actuates the butterfly valve 49 in the fuel intake of the motor 1, and since outward movement of the weights 25 will cause the tie-rod 45 to move toward the left the consequent movement of the butterfly valve will decrease the fuel supply to the motor and thus decelerate the motor speed. Thus, as the motor 1 rotates, centrifugal force causes the weights 25 to fly toward their outermost position and upon reaching this position they cause the closing of the throttle valve 49 to prevent a further increase in the speed of the motor.

Conversely, as the speed of the motor is decreased, the weights 25 move in towards the shaft 17 causing the plate 29 to move in the same direction and pivot the lever 41 about its fulcrum 43. This makes the tie-rod 45 pivot the butterfly valve about its fulcrum 51 toward its open position to increase the fuel supply to the motor and to thus tend to accelerate the speed of the motor.

As is customary in centrifugal governors, the weights 25 are held in their retracted position by the governor spring 33 and the tension of this spring determines the motor speed at which the weights 25 will move to their outermost position. In order to house the spring, a casing 53 having a bore 55 extending therethrough is secured on the frame of the motor. The bore 55 communicates with a recess 57, formed in one end of the casing 53, and has a plunger 59, provided with a flange 61 resting in the recess 57, extending therethrough. One end of the spring 33 rests against the flange 61 and the opposite end bears on member 63 and holds that member against a projection 65 provided on the lever 41.

The portion of the plunger 59 which extends outside of the casing 53 bears against a hooked lever 67, fulcrumed on the casing 53 at 69 and adapted to move the plunger 59 to compress or release the spring 33. Since the speed setting of the governor is determined by the amount of force the weights 25 must exert on the plate 29 in order to overcome the force of the spring 33, it is apparent that, should the hooked lever 67 force the plunger 59 to compress the spring 33 to its compression limit, the motor will have to operate at its maximum speed in order that the centrifugal force of the weights 25 shall be sufficient to overcome the resistance of the spring 33. Under such conditions, consequently, in order for the weights to move outwardly enough to move the lever 41 to throttle the motor, the speed of the motor must exceed the maximum desired speed.

Conversely, if the hooked lever 67 is moved in the opposite direction, so that the spring 33 may expand, plate 29 may be moved out from the shaft 17, by the weights 25, when the motor is operating at a much slower rate. As a result, under such circumstances, the motor will operate at a minimum speed and the slightest increase in speed will cause the weights 25 to move the plate 29 further away from the shaft and thereby further close the butterfly valve to throttle the motor intake and decrease the speed to the desired minimum motor operating speed.

It follows, therefore, that, if the position of the hooked lever 27 is controlled, the speed setting of the governor may be changed to regulate the motor speed in varying degrees and for that purpose a pressure responsive device which will assume various positions in accordance with the discharge pressure of the compressor is connected to the lever 67 by a tie-rod 71.

The details of the regulating mechanism are best illustrated in Fig. 2. With reference thereto it will be noted that it consists of a casing generally indicated at 72 secured to the motor frame by suitable means such as the bolts 73 and provided with a bellows chamber 74 closed by a head 75. The interior of the bellows chamber 74 is connected directly to the receiver tank by a conduit 76. The conduit 76 threadedly engages the bushing 77 which has an orifice 78 to restrict the flow of fluid coming from the receiver. The fluid enters the bellows chamber 74 after leaving the orifice 78 through the passage 79.

Head 75 is provided with a passage 80 through which extends the plunger rod 81, having a piston member 82 fastened to the end thereof within the bellows chamber. One end of a bellows 83 is secured to the piston 82 in air-tight relationship and the opposite end of the bellows is secured in air-tight relationship between the casing 72 and the head 75 in order that it will be impossible for any fluid in the bellows chamber 74 to enter the bellows proper 83.

At the opposite side of the casing, to that where orifice 78 is positioned, is a passage 84 passing through a portion of the casing 72 and the head 75. In this passage is a bushing 85 with an orifice 86 secured in an end thereof. The area of the orifice 86 is larger than the area of the orifice 78 and, consequently, the fluid entering the bellows chamber is restricted more than the fluid leaving the bellows chamber through orifice 86.

With this arrangement of parts the bellows chamber wil be subjected to fluid at the same pressure as the fluid in the receiver tank since fluid is conveyed from the receiver tank to the bellows chamber by the conduit 76 and enters the chamber through the orifice 78. If the orifice 86 were not provided, it is readily apparent that the bellows chamber 74 would constantly be subjected to the same pressure as the receiver 11. However, with a means, which will be described hereinafter, to open and close the venting orifice 86 the pressure in the bellows chamber 74 will vary considerably from the pressure in the receiver tank 11.

The external end of the plunger rod 81 is clevised and rotatably fastened to the lever 87 by the pin 88 which also serves to connect the regulator lever 89, fulcrumed at 90, on the head 75. The pin 88 thus makes it possible to have relative rotation between the levers 87 and 89 and the plunger 81. Surrounding this pin connection is a guard 91 formed as a part of the head 75 threadedly engaged by the bolt 92, locked in position by the lock nut 93, to regulate the outward movement of the plunger 81.

As a result of this arrangement, when orifice 86 is closed, the pressure in the bellows chamber 74 corresponds to the pressure in the receiver tank 11, and if the pressure is sufficient, it will move the bellows 83 to the right. This movement will be opposed by the resilience of the bellows 83 and the pressure of atmosphere, since passage 80 is large enough to permit air to enter around the plunger 81 into the interior of the bellows 83.

Of course, as the bellows 83 moves to the right it will allow the plunger 81 to move to the right also and movement will cease only when the end of the plunger 81 bears against the bolt 92.

Conversely, when the orifice 86 is opened, the pressure in the bellows chamber 74 will drop since fluid may escape to atmosphere permitting the resilience of the bellows 83 and atmospheric pressure to move the bellows to the left carrying the plunger 81 with it.

Movement of the plunger 81 will pivot lever 89 about its fulcrum 90 and thus, by means of tie-rod 71, transmit movement of the bellows 83 into regulation of the compression on governor spring 33.

The apparatus controlling the opening and closing of orifice 86 will now be described. In the upper part of the casing 72 is a recess 94 having an enlarged portion 95 in which is secured, by plate 96, suitably fastened to the casing, a diaphragm 97. A branch of conduit 76 is secured in the passage 98 opening into the diaphragm chamber 99. It will thus be seen that the receiver tank pressure will be maintained in the diaphragm chamber 99. At the casing end of recess 94 is a threaded bore 100 designed to receive the guide bushing 101 for the plunger 102 extending into the recess.

The plunger 102 has a follower portion 103 bearing against the diaphragm 97. Within the recess 94 the guide bushing 101 has a flange 104 on which one end of a spring 105 rests and the opposite end of the spring bears against the follower 103. By means of the guide bushing 101 the compression of the spring 105 may be regulated and a lock nut 106 serves to maintain the bushing in a fixed position.

The end of the plunger 102 opposite to the end having the follower 103 is reduced in diameter and has a threaded portion 107 to receive a regulating bushing 108 and a locking means such as the nut 109. The upper portion of lever 87 is provided with a passage 110 of sufficient diameter to permit the shaft 102 to pass therethrough.

A spring 111 is maintained between the lever 87 and the bushing 108. Where the reduced portion of the shaft 102 begins a shoulder is formed and which provides a seat for the slidable abutment 112. This slidable abutment is freely movable on the reduced portion of the shaft 102. The spring 111 normally holds the lever 87 against the abutment 112. In order to permit free movement of the lever 87 about pin 88 and a constant contact point between that lever and abutment 112, a recessed surface 113 is formed on the lever 87 to prevent the tip end of the lever from touching the abutment. Intermediately placed on the lever 87 is a button valve 114 which is so positioned with respect to the orifice 86 in the bushing 85 that, under normal conditions, the button obstructs the orifice and at least to some degree prevents escape of fluid from the bellows chamber 74.

In order to lock the apparatus in the maximum speed setting position, a locking cam and handle 115 is pivotally mounted on the head 75 and may be moved into position to lock the lever 89 in a position to maintain the maximum tension on the governor spring 33.

From this description it will be seen that, as the pressure in the receiver tank 11 increases, the pressure on diaphragm 97 will increase, tending to move the diaphragm and shaft 102 toward the right against the resistance of spring 105. As shaft 102 moves to the right, it pushes abutment 112 against the end of lever 87 which, consequently moves rightwardly. Only the upper portion of lever 87 will move since the lower end pivots about pin 88 and, consequently, the button valve 114 is moved away from orifice 86 to open that orifice. On the other hand, assuming that orifice 86 is open, due to a high pressure in the receiver tank, and that the pressure begins to fall, the diaphragm 97, shaft 102, bushing 108 and spring 111 will be moved leftwardly when the compression of spring 105 is sufficient to overcome the pressure of the fluid in diaphragm chamber 99. This movement will pivot lever 87 toward the left and thereby close orifice 86.

In the modified regulator illustrated in Figs. 3 and 4 the parts and the operation is slightly different and it will be seen to consist of a casing 116 securely fastened to the frame of the motor by suitable means such as the bolts 117.

The casing 116 is provided with a bellows chamber 118, closed by a head 119, communicating with the intake manifold 120 of the motor 1 through the opening 121, in which is secured a bushing 122, having an orifice 123, to connect the pipe 124, leading from the intake 120 of the motor, to this chamber. Within the chamber 118 and bearing against a wall thereof is a spring 125, the other end of which bears against the member 126, provided with a flange 127, forming the head of the bellows 128 and to which one end of the bellows is secured. The other end of the bellows is held between the casing 116 and the head 119.

Centrally located in the head 119 is a bore 129 through which extends a hollow shaft 130 secured to the member 126 and providing communication with the passage 131 in the member 126. A bushing 132 having an orifice 133, is inserted in the passage through shaft 130 which vents the chamber 118 to the atmosphere.

It will thus be apparent that, while the motor is operating, the vacuum set up in the intake manifold is directly communicated to the bellows chamber 118 through the conduit 124, the orifice 123 and the opening 121. If there were no vent for this chamber, the vacuum set up therein would cause the bellows to expand against the compressive force of the spring 125. However, since the evacuation of air from the bellows chamber 118 is restricted by the orifice 123, a vacuum cannot be effected in that chamber unless the orifice 133 is at least partially closed. Thus, with this orifice 133 open, air may enter through the orifice 133 and pass through the shaft 130 and the member 126 into the casing and be drawn through the conduit 124 to the intake manifold 120.

The shaft 130 carries an extension clevis 134 to which is fastened, by the stud 135, the lever 136 fulcrumed on a portion of the head 119, at 137, and rotatably secured to the tie-rod 71. It will be seen that movement of the bellows under the influence of the vacuum in chamber 118 will be directly transmitted to the governor spring 33. The range of longitudinal movement of the shaft 130 is limited by the position of bolt 164 threadedly engaged in the head 119. Movement of the bellows 128 and the shaft 130 is controlled by regulating the degree of the vacuum set up in the chamber 118. Such regulation is accomplished by the T-lever 138 fulcrumed at 139 and adapted to control the orifice 133.

The movement of the lever 138 is controlled by the pressure responsive device generally indicated at 140. This device consists of plunger 141 having a head 142 and adapted to be actuated by a diaphragm 143 against which it is held by the pressure of a coil spring 144. Plunger 141 is guided in a sleeve 145 extending into chamber 146 formed in casing 116, and threaded therein being held in place by lock nut 147. Diaphragm 143 is held in place by a head 148 bolted to flange 149 of casing 116 and forming a pressure chamber 150, the inlet 151 of which is connected by means of pipe 152 to the receiver tank 11. Spring 144 bears against the head 142 of plunger 141 and flange 153 on bushing 145, its tension being adjustable by screwing the bushing 145 into or out of the chamber 146, suitable flats 154 being provided for that purpose on the bushing 145.

A part 155 of the shaft 144, which extends outside of the casing 116 and sleeve 145, is reduced in diameter and is provided with a bearing flange 156 of greater diameter than the shaft 141 proper. Slidable member 157 supported by this part 155 of the shaft and bearing against the spring 158 is held on the shaft by a nut 159, which also serves to regulate the degree of compression on the spring 158. Leg 160 of lever 138 is interposed between bearing flange 156 and spring 158 being provided with a hole 161 to receive portion 155 of plunger 141. The motion of plunger 141 is thus transmitted to lever 138 to vary the restriction at the opening of orifice 133. One portion of the member 157 rests on the raised portion 162 provided on the leg 163 of the T-lever 138 and is arranged to latch therewith as will be described hereinafter.

With reference again to Figs. 1 and 3, a means to unload and reload the compressor is provided between conduit 9 and the compressor 7. The details of this device are illustrated in Fig. 5 and consist of a casing 165 connected to the conduit 9. A portion of the walls of the casing extend within the outer walls thereof to form the valve guides 167 for the balanced cylindrical valve 169. An opening 171 in the casing is closed by a plate 173 which is provided with a recess 175 wherein a spring 177 rests. This spring normally urges the cylindrical valve toward its right hand or open position. When the valve is in its open position, the fluid may enter from conduit 9, flow past the cylindrical valve 169 and into the compressor.

Another chambered casing 179 is secured on one side of the casing 165 directly opposite to the plate 173. In this chamber casing is the guide 181 formed integrally with the chamber casing 165 to slidably support a bushing 183 which, in turn, supports the rod 185. One end of the rod bears against the cylindrical valve 169 and has a head 187 formed at the opposite end thereof.

The head 187 rests against a diaphragm 189 which is secured to the chamber casing 179 by the cup 191. The bushing 183 is formed with a flange 193 to bear against the spring 195, normally urging the head 187 and shaft 185 toward the right. Between the diaphragm and the cup 191, is a chamber 197 which is in direct communication with the receiver tank 11 through the conduit 199. With this device forming part of the compressor unit it will be noted that, as the pressure in the receiver tank increases to the point where it is sufficient to move the head 87 against the compression of the spring 195, the rod 185 will move to the left hand, consequently, move the cylindrical valve toward its closed position.

If the pressure should decrease after reaching this point, the spring 195 will move the rod 185 toward the right against the pressure in the receiver and the cylindrical valve will follow the rod 185, being urged by the spring 177.

The operation of the invention described above is as follows:

Referring again to the regulator shown in Figs. 1 and 2 and assuming that the pressure in the receiver 11 is below a desired minimum value, lack of pressure in the chamber 99 permits the spring 105 to maintain the diaphragm 97 and the shaft 102 in its left hand position (Fig. 2). In that position the spring 111 will hold the lever 87 against the abutment 112 thus holding the button valve 114 against the orifice 86 to prevent the escape of fluid through the orifice from the chamber 74. With this orifice closed, the pressure in chamber 74 will naturally be the same as the pressure existing in the receiver tank 11.

Upon increasing the pressure in the chamber 74 the bellows 83 will collapse causing plunger 81 to exert force on lever 89 which, through link 71, lever 67 and plunger 59, compresses the governor spring 33 tending to open the throttle valve 49. In this manner the speed setting of the governor 15 is changed to increase the speed of engine 1. As the motor speeds up, the pressure in the receiver tank begins to rise and to increase the pressure on diaphragm 97. Shaft 102 thus pushes against the abutment 112 which, in turn, moves the lever 87 until the button valve 114 begins to open the orifice 86. Fluid may then escape faster from chamber 74 through the larger orifice 86 than it enters the chamber through the smaller orifice 78. Atmosphereic pressure within the bellows 93 then tends to expand the bellows and to withdraw shaft 81 into the bellows pulling with it lever 89 and correspondingly reducing the compression of governor spring 33, closing the throttle valve 49, and reducing the engine speed. The reduction in engine speed correspondingly reduces the rate of increase of compressor discharge pressure at receiver 11. As the discharge pressure continues to increase, plunger 102 continues to push against lever 87 so as to maintain orifice 86 open.

The above described interaction continues until the motor speed is reduced to a point at which the compressor produces just enough air to supply the demand or until the discharge pressure reaches a predetermined value whereat the motor is reduced to its minimum speed. Prior to reaching such predetermined pressure the diaphragm 97 and plunger 102 will have reached their extreme right hand position where they remain so long as the pressure in the receiver 11 does not fall.

Upon reaching the predetermined high pressure above referred to, the compressor is further unloaded progressively by choking its inlet. This is accomplished by apparatus shown in detail in Fig. 5. The initial compression of the spring 195 is adjusted by means of the threaded bushing 183 to equal the total pressure on the opposite side of diaphragm 189 when the above mentioned predetermined high pressure is reached. At values above that pressure, diaphragm 189 pushes the plunger 185 against inlet valves 169 to overcome compression of the spring 177; thus, the openings at 167 become more or less restricted to unload the compressor 7 in a degree corresponding to the pressure existing in the receiver 11, while the speed of motor 1 remains at its minimum. At some predetermined high pressure it will be seen that the valve 169 will completely choke the compressor inlet and thereby completely unload the compressor. Upon reduction of discharge pressure, the compressor will be completely reloaded inasmuch as the valve 169 will be at its open-most position.

The speed of the engine 1 will be resumed if the discharge pressure continues to fall. During such lowering of pressure, plunger 102 is withdrawn into the chamber 94 with consequent change in the position of lever 87 to thereby permit the button valve 114 to close the orifice 86. The spring 105 will hold the plunger 102 in the withdrawn position until the pressure in the receiver tank increases whereupon the same cycle will occur.

Obviously, under varied loads, the regulator may accelerate or decelerate the engine 1 without approaching the minimum or maximum speeds of the engine 1. Furthermore, the pressure in the spring 105 may be adjusted to predetermine the pressure necessary to move the plunger 102 and by this means the minimum and maximum speeds may be predetermined.

The operation of the regulator of Figs. 3 and 4 is as follows:

Assuming that the pressure in the receiver 11 is below a desired minimum value, a lack of pressure in the chamber 150 permits the spring 144 to move the diaphragm 143 and the shaft 141 to the left (Fig. 4). In that position the lug 157 has passed beyond the raised portion 162 and rests in the recess 168 formed on the leg 163 of the T-lever 138. The T-lever 138 is held out of engagagement with the orifice bushing 132 and permits the entry of air through the orifice and shaft to the chamber 118. Atmospheric pressure in chamber 118 equalizes the fluid pressure on bellows 128 and permits spring 125 to collapse the bellows and exert force on lever 136 which, through link 71, lever 67 and plunger 59, compresses governor spring 33 tending to open throttle valve 49. In this manner the speed setting of the governor 15 is changed to increase the speed of engine 1. As the motor speeds up, the pressure in the receiver tank begins to rise and to increase the pressure on diaphragm 143. Plunger 141 thus pushes against the end 160 of lever 138 until the other end of that lever begins to restrict the orifice in bushing 132. Air is then withdrawn from chamber 118 faster through the larger orifice 123 than it enters the smaller orifice 132. Atmospheric pressure within bellows 128 opposes the spring 125 and the shaft 126 tends to withdraw from lever 138 pulling with it lever 136 and correspondingly reducing the compression of governor spring 33, closing the throttle valve 4, and reducing the engine speed. The reduction in engine speed also reduces the rate of increase of compressor discharge pressure at receiver 11.

As the discharge pressure continues to increase, plunger 141 continues to push against lever 138 so as to close the orifice 133 and, simultaneously, the unbalance of air pressure on bellows 128 tends to withdraw that orifice from the lever with the consequent adjustment of compression of governor spring 33 causing reduction in the motor speed. The above described interaction continues until the motor speed is reduced to a point at which the compressor produces just enough air to supply the demand or until the discharge pressure reaches a predetermined value whereat the motor is reduced to its minimum speed also.

Prior to reaching such predetermined pressure, the sliding flange 157 has been hooked behind the projection 162. As the pressure increases and plunger 141 moves to the right, the portion of lever 138 designated by 160 also moves to the right. This movement causes projection 162 to move down until sliding flange 157 over-rides projection 162 and flange 157 is pushed ahead by spring 158 to lock lever 138 in place. The pressure responsive devices including lever 138 and bellows 128 and the devices actuating and actuated by them are rendered inoperative until a predetermined low discharge pressure is reached as will be described hereinafter.

The unloading device of Fig. 5 operates with this regulator in the same manner as described in connection with the regulator of Figs. 1 and 2. Thus, after unloading the compressor and reloading the compressor, the speed of the engine 1 will not be resumed until the lowest permissible discharge pressure is reached, due to the latching of the plunger 157 on the projection 162 of lever 138 (Fig. 4). During such lowering of pressure, plunger 141 is withdrawn into chamber 146 without change in the position of lever 138, keeping closed the orifice 133 until nut 159 withdraws flange 157 from engagement with projection 162. Spring 158 is compressed during such withdrawal and, upon the disengagement referred to, causes end 160 of lever 138 to resume its position against the abutment 156, whereupon flange 157 drops into the recess 165. Correspondingly, the end of lever 138 moves out of engagement with the orifice 133 to admit atmospheric pressure into bellows 128. Thereupon, the movement of plunger 141, under the influence of pressure in chamber 150, resumes control of the movement of the lever 136 and governor spring 33 as described above.

It will be seen that adjustment of the sleeve 145 in the casing is effected by turning the nut 154 and has the effect of moving the button 156 longitudinally with regard to the housing and, correspondingly, moves the end of lever 138. By this means, therefore, can be adjusted the pressure at which speed of the motor 1 begins to be effected. Likewise, adjustment of the sliding flange 157 with respect to the plunger 141, which is effected by adjustment of nut 159, will effect the low pressure at which plunger 157 disengages itself from the projection 162. The maximum speed of the motor may also be determined by adjustment of the stop screw 164 which limits the movement of lever 136 (Fig. 4).

If, for example, the motor is to be operated at its minimum speed when the pressure in the receiver tank has reached 95 pounds per square inch, the compression of spring 105 is so adjusted in the regulator of Fig. 2 that lever 87 will hold valve 114 in position to prevent the escape of fluid from chamber 74 and likewise the compression of the spring 144 of the regulator of Fig. 4 is so adjusted that the lever 138 will prevent entrance of air into the chamber 118 to thus reduce the motor speed to the minimum when that pressure is reached. If the pressure at which the unloading device is to begin functioning is 100 pounds per square inch, the proper compression on the spring 195 is secured by regulation of the bushing 183, and when pressure increases to that pressure the unloading device will come into action and will gradually close the cylindrical valve. If the pressure increases still more until it reaches the pressure at which the compressor is to be completely unloaded, namely, at 105 pounds per square inch, the compressor will be completely unloaded. As long as the pressure in the receiver remains within the range of 100 to 105 pounds per square inch, the cylindrical valve will assume a closed or partly closed position comparable with the pressure in the receiver tank. If, however, the pressure in the receiver tank falls below 100 pounds per square inch, the spring 195 will overcome the pressure in the receiver tank and maintain the cylindrical valve open. Should the pressure continue to fall because of a heavy load, the governor regulator of Fig. 2 will begin to accelerate the motor towards its maximum speed as soon as the pressure falls below 95 pounds pressure and will thenceforth control the speed of the engine whereas the regulator of Fig. 4 will continue to maintain the motor at its minimum speed until some pressure such as 80 pounds per square inch is reached at which time the lever 138 will be free from the orifice as was explained previously and the motor may again accelerate to its maximum speed.

It is manifest, therefore, that the unloading and reloading device will not operate until a pressure is reached sufficient to maintain the governor at a minimum speed setting position and will then vary the degree of loading of the compressor in accordance with variations in the discharge pressure of the compressor. Furthermore, when the pressure falls, the governor speed regulator of Fig. 2 will begin regulating the motor speed as soon as the compressor is completely reloaded whereas the regulator of Fig. 4 will maintain the motor at its minimum speed until a much lower pressure than that required to obtain minimum speed is reached.

The pressures herein designated have been assumed merely for the sake of explanation and may be varied to secure other speed and unloading ranges provided the unloading device does not begin to function until the motor is operating at substantially its minimum speed. Furthermore, it may be advantageous to operate the compressor unit in a manner to permit the compressor to begin unloading at the same pressure as that at which the speed of the motor is reduced to its minimum speed.

During the operation of the compressor under the above pressure settings and under loads which prevent the receiver pressure from increasing to 95 pounds per square inch, the motor speed will progressively and degressively vary as the pressure in the receiver increases and decreases. Thus, if the pressure in the receiver increases and decreases, the motor speed will increase and decrease inversely with the pressure changes. Of course, with the regulator of Fig. 4, after the pressure reaches 95 pounds per square inch, this regulator maintains the speed at the minimum speed until the pressure in the receiver decreases to the predetermined low pressure, namely 80 pounds per square inch, at which point the compressor will begin reloading at maximum speed again.

Likewise, when the pressure in the receiver hovers within the range of 100 to 105 pounds per square inch, the degree of unloading or reloading varies progressively and degressively with the pressure change. Thus, at a pressure in close proximity to 105 pounds per square inch, the compressor will be almost completely unloaded whereas, with the pressure above but in close proximity to 100 pounds per square inch, the compressor will be almost completely reloaded. Within this range the amount which the unloading valve opens and closes depends on the pressure in the receiver tank and will vary with the variations of the pressure. Upon an increase in pressure, the valve will close and, upon a decrease in pressure, it will open.

It is understood that the constructions above described are preferred embodiments of the invention and that many changes which do not depart from the scope and spirit of the invention will occur to those skilled in the art.

I claim:

1. In a motor driven fluid compressor unit having a motor speed governor, a pressure responsive regulator to control and vary the speed setting of the governor upon variation of the discharge pressure of the compressor below a predetermined high discharge pressure, and means to vary the quantity of fluid admitted to the compressor between a maximum and a minimum quantity upon any variation in the discharge pressure of the compressor above said predetermined high discharge pressure.

2. In a motor driven fluid compressor unit having a motor speed governor, a pressure responsive regulator to control and vary the speed setting of the governor between maximum and minimum motor speed upon any variation of the discharge pressure respectively between a predetermined minimum discharge pressure and a predetermined high discharge pressure of the compressor, and means to vary the quantity of fluid admitted to the compressor between a maximum and a minimum quantity upon any variation in the discharge pressure respectively between said predetermined high discharge pressure and a predetermined maximum discharge pressure of the compressor.

3. In a motor driven fluid compressor unit having a motor speed governor, a pressure responsive regulator to control and vary the speed setting of the governor having speed setting positions between maximum and minimum motor speed, means to control the pressure responsive regulator and vary its speed setting position upon any variation in the discharge pressure of the compressor between a predetermined minimum discharge pressure and a predetermined high discharge pressure, and means to vary the quantity of fluid admitted to the compressor upon variation in the discharge pressure of the compressor above said predetermined high discharge pressure.

4. In a motor driven fluid compressor unit having a motor speed governor, pressure responsive means having positions intermediate the maximum and minimum motor speeds to control and vary the speed setting of the governor, means to control the pressure responsive means and vary its speed setting position between maximum and minimum motor speeds upon respective variations intermediate a predetermined minimum discharge pressure and a predetermined high discharge pressure of the compressor, and means to vary the quantity of fluid admitted to the compressor between a maximum and a minimum quantity upon any variation in the discharge pressure of the compressor respectively between said predetermined high discharge pressure and a predetermined maximum discharge pressure of the compressor.

5. In a motor driven fluid compressor unit having a motor speed governor, pressure responsive means to control and vary the speed setting of the governor upon variation of the discharge pressure of the compressor below a predetermined high discharge pressure comprising a casing having a chamber, means in the chamber subject to the discharge pressure of the compressor adapted to regulate the speed setting position of the governor, a vent for the chamber, a second chamber in the casing subject to the discharge pressure of the compressor, means responsive to the discharge pressure in said second chamber to open and close said vent, and means to vary the quantity of fluid admitted to the compressor upon any variation in the discharge pressure of the compressor above said predetermined high discharge pressure of the compressor.

6. In a motor driven fluid compressor unit having a speed setting governor to regulate the speed of the motor, a pressure responsive device to control and vary the speed setting of the governor upon variation of the discharge pressure of the compressor below a predetermined high discharge pressure and having a maximum and minimum speed setting position, means forming a part of said device to cause the pressure responsive device to gradually change the speed setting of the governor to the minimum speed position as the discharge pressure approaches said predetermined high discharge pressure, and means to vary the quantity of fluid admitted to the compressor upon any variation in the discharge pressure of the compressor between said predetermined discharge pressure and a predetermined maximum pressure.

7. In a motor driven fluid compressor unit having a speed setting governor to regulate the speed of the motor, a pressure responsive device to control and vary the speed setting of the governor upon variation of the discharge pressure of the compressor below a predetermined high pressure, means to predetermine said high pressure, and means to vary the quantity of fluid admitted to the compressor upon any variation in the discharge pressure above said predetermined high discharge pressure.

8. In a motor driven fluid compressor unit having a speed setting governor to regulate the speed of the motor, a pressure responsive device to control and vary the speed setting of the governor between maximum and minimum motor speed positions upon any variation of the discharge pressure respectively between a predetermined minimum discharge pressure and a predetermined high discharge pressure of the compressor, means to predetermine said minimum and high discharge pressures, means to vary the quantity of fluid admitted to the compressor between a maximum and a minimum quantity upon any variation in the discharge pressure respectively between said predetermined high discharge pressure and a predetermined maximum discharge pressure of the compressor, and means to predetermine said high and maximum pressures with respect to the last said means.

9. In a motor driven fluid compressor unit having a speed setting governor to regulate the speed of the motor, a pressure responsive device to control and vary the speed setting of the governor upon variation of the discharge pressure of the compressor below a predetermined high discharge pressure, and means to vary the quantity of fluid admitted to the compressor upon any variation in the discharge pressure of the compressor above said predetermined high discharge pressure comprising a casing having a chamber therein associated with the fluid inlet of the compressor, a valve in the fluid inlet of the compressor, movable means subject to the discharge pressure of the compressor in said chamber and connected to move said valve upon movement thereof, and means to predetermine the pressure at which said movable means will move.

10. In a motor driven fluid compressor unit having a speed setting governor to regulate the speed of the motor, a pressure responsive device to control and vary the speed setting of the governor upon variation of the discharge pressure of the compressor below a predetermined high discharge pressure and having various speed setting positions between maximum and minimum speed setting position, means forming a part of said device to cause the device to gradually change the speed setting of the governor to the minimum speed position as the discharge pressure approaches said predetermined high discharge pressure and to gradually change the speed setting of the governor to the maximum speed position as the discharge pressure decreases from said predetermined high discharge pressure toward a predetermined minimum discharge pressure, and means to vary the quantity of fluid admitted to the compressor upon any variation in the discharge pressure of the compressor between said predetermined high discharge pressure and a predetermined maximum pressure.

11. In a motor driven fluid compressor unit having a speed setting governor to regulate the speed of the motor, a pressure responsive device to control and vary the speed setting of the governor upon variation of the discharge pressure of the compressor below a predetermined high discharge pressure and having various speed setting positions between maximum and minimum speed setting position, means forming a part of said device to cause the device to gradually change the speed setting of the governor to the minimum speed position as the discharge pressure approaches said predetermined high discharge pressure and to gradually change the speed setting of the governor to the maximum speed position as the discharge pressure decreases from said predetermined high discharge pressure toward a predetermined minimum discharge pressure, means to gradually reduce the quantity of fluid admitted to the compressor to a minimum as the discharge pressure approaches a predetermined maximum discharge pressure and to increase the quantity of fluid admitted to the compressor to maximum as the discharge pressure decreases from the predetermined maximum discharge pressure toward the predetermined high discharge pressure.

12. In a motor driven fluid compressor unit having a speed setting governor to regulate the speed of the motor, a pressure responsive device to control and vary the speed setting of the governor upon variation of the discharge pressure of the compressor below a predetermined high discharge pressure and having various speed setting positions between maximum and minimum speed setting position, means forming a part of said device to cause the device to gradually change the speed setting of the governor to the minimum speed position as the discharge pressure approaches said predetermined high discharge pressure and to gradually change the speed setting of the governor to the maximum speed position as the discharge pressure decreases from said predetermined high discharge pressure toward a predetermined minimum discharge pressure, and means to vary the quantity of fluid admitted to the compressor upon any variation in the discharge pressure of the compressor above said predetermined high discharge pressure comprising a casing having a chamber therein associated with the fluid inlet of the compressor, a valve in the fluid inlet of the compressor, movable means subject to the discharge pressure of the compressor in said chamber and connected to move said valve upon movement thereof, and means to predetermine the pressure at which said movable means will move.

13. In a motor driven fluid compressor unit having a speed setting governor for the motor, a pressure responsive means to control and vary the speed setting of the governor upon variation of the discharge pressure of the compressor below a predetermined high discharge pressure comprising a casing having a chamber, means in the chamber subject to the discharge pressure of the compressor adapted to regulate the speed setting position of the governor, a vent for the chamber, a second chamber in the casing subject to the discharge pressure of the compressor, means to open and close said vent responsive to the discharge pressure in said second chamber, means to vary the quantity of fluid admitted to the compressor upon any variation in the discharge pressure of the compressor above said predetermined high discharge pressure comprising a casing having a chamber therein associated with the fluid inlet of the compressor, a valve in the fluid inlet of the compressor, movable means subject to the discharge pressure of the compressor in said chamber and connected to move said valve upon movement thereof, and means to predetermine the pressure at which said movable means will move.

14. In a motor driven fluid compressor unit having a speed governor, a pressure responsive device to control and vary the speed setting of the governor upon variation of the discharge pressure of the compressor below a predetermined high discharge pressure, means to gradually reduce the quantity of fluid admitted to the compressor to a minimum as the discharge pressure approaches a predetermined maximum discharge pressure and to increase the quantity of fluid admitted to the compressor to maximum as the discharge pressure decreases from the predetermined maximum discharge pressure toward the predetermined high discharge pressure.

15. In a motor driven fluid compressor unit, a governor to regulate the speed of the motor having various speed setting positions between a maximum and a minimum speed setting position, a pressure device subject to the discharge pressure of the compressor to control and gradually change the speed setting position of the governor to the minimum speed position as the discharge pressure of the compressor approaches a predetermined high discharge pressure and to change the governor to the maximum speed position as the discharge pressure decreases toward a predetermined minimum pressure, means to predetermine said high and minimum pressures, means to gradually reduce the quantity of fluid admitted to the compressor to a minimum as the discharge pressure approaches a predetermined maximum pressure and to increase the quantity of fluid admitted to the compressor to a maximum as the discharge pressure approaches said predetermined high discharge pressure, and means to predetermine said high and maximum discharge pressures with respect to the last said means.

16. In a motor driven fluid compressor unit having a motor speed governor, a pressure responsive device for controlling and varying progressively and degressively the speed setting of the governor in accordance with variations of the discharge pressure of the compressor, means to progressively and degressively unload and reload the compressor in accordance with the discharge pressure of the compressor above a predetermined high discharge pressure, and means to prevent said pressure responsive device from varying the speed setting of the governor when said predetermined high pressure is reached and unitil a predetermined minimum discharge pressure is reached.

17. In a motor driven fluid compressor unit having a motor speed governor, a pressure responsive device for controlling and progressively and degressively varying the speed setting of the governor in accordance with the variations in the discharge pressure of the compressor, means to progressively and degressively unload and reload the compressor in accordance with the discharge pressure below a predetermined compressor discharge pressure, means to render the pressure responsive device inoperative at said predetermined discharge pressure and operative thereafter at a predetermined minimum pressure to vary the speed setting of the governor, and adjustable means to regulate the pressure range within which the last said means operates.

18. In a motor driven fluid compressor unit having a motor speed governor, a pressure responsive device for controlling and progressively and degressively varying the speed setting of the governor in accordance with the variations in the discharge pressure of the compressor, means to progressively and degressively unload and reload the compressor in accordance with the discharge pressure of the compressor above a predetermined pressure, adjustable means to predetermine the pressure at which the last said means operates, means to render the pressure responsive device inoperative to vary the speed setting of the governor at said predetermined discharge pressure and thereafter render it operative at a predetermined minimum pressure, and adjustable means to regulate the pressure range within which the last said means operates.

19. In a motor driven fluid compressor unit having a motor speed governor, a pressure responsive device for controlling and progressively and degressively varying the speed setting of the governor in accordance with variations in the discharge pressure of the compressor, means to progressively and degressively unload and reload the compressor in accordance with the discharge pressure of the compressor above a predetermined pressure, adjustable means to predetermine the pressure at which the last said means operates, and means to render the pressure responsive device inoperative to vary the speed setting of the governor at a predetermined pressure not exceeding the first said predetermined pressure and to maintain the pressure responsive means inoperative thereafter until a predetermined low discharge pressure is reached.

20. In a motor driven fluid compressor unit having a motor speed governor, a pressure responsive device for controlling and progressively and degressively varying the speed setting of the governor in accordance with variations in the discharge pressure of the compressor, means to progressively and degressively unload and reload the compressor in accordance with variations in the discharge pressure of the compressor above a predetermined pressure adapted to unload the compressor completely at a predetermined maximum discharge pressure, and means to render the pressure responsive device inoperative to vary the speed setting of the governor.

21. In a motor driven fluid compressor unit having a motor speed governor, pressure responsive means to control and progressively and degressively vary the speed setting of the governor in accordance with variations of the discharge pressure of the compressor, means to progressively and degressively unload and reload the compressor in accordance with variations in the discharge pressure of the compressor within a predetermined range of compressor discharge pressures and above a predetermined high pressure, and means to lock the first said means to render it inoperative within a lower predetermined discharge pressure range when said predetermined high pressure range is reached.

22. In a motor driven fluid compressor unit having a motor speed governor, means responsive to variations of the discharge pressure of the compressor to control and progressively and degressively vary the speed setting of the governor, means to progressively and degressively unload and reload the compressor in accordance with variations in the discharge pressure of the compressor above a predetermined high pressure, and means to lock the first said means to render it inoperative to vary the speed setting of the governor at said predetermined high pressure.

23. In a motor driven fluid compressor unit having a motor speed governor, a pressure responsive device for controlling and progressively and degressively varying the speed setting of the governor in accordance with variations in the discharge pressure of the compressor, means to unload the compressor progressively and degressively above a predetermined high discharge pressure until a predetermined maximum discharge pressure is reached and to progressively and degressively reload the compressor as the pressure falls from the predetermined maximum discharge pressure until said predetermined high discharge pressure is reached, means to lock the pressure responsive device to render it inoperative to vary the speed setting of the governor at said predetermined high discharge pressure to permit the governor to maintain the motor at minimum speed and to unlock the pressure responsive device to permit the governor to accelerate the speed of the motor to a maximum when a predetermined lower discharge pressure is reached.

24. In a motor driven fluid compressor unit having a motor speed governor, a source of fluid, means actuated by said fluid for controlling and progressively and degressively varying the speed setting of the governor, means responsive to the discharge pressure of the compressor to control actuation of the first said means by said fluid, and means to progressively and degressively unload and reload the compressor in accordance with variations in the discharge pressure of the compressor.

25. In a motor driven fluid compressor unit having a motor speed governor, a source of fluid, means actuated by said fluid for controlling and progressively and degressively varying the speed setting of the governor, means to prevent actuation of the first said means by said fluid, means responsive to variations in the discharge pressure of the compressor to control the last said means, and means to progressively and degressively unload and reload the compressor in accordance with variations in the discharge pressure of the compressor.

26. In a motor driven fluid compressor unit having a source of fluid, a motor speed governor regulator comprising a chamber, means in the chamber actuatable by said fluid, means to vent the chamber and prevent actuation of the last said means by the fluid, means associated with the means in the chamber to transmit movement thereof to the governor, pressure responsive means subject to the discharge pressure of the compressor, means controlled by the pressure responsive means to open and close the venting means, and means to unload and reload the compressor above a predetermined high pressure comprising a casing having a chamber subject to the discharge pressure of the compressor, movable means responsive to variations of the discharge pressure of the compressor, and a valve associated with the movable means to vary the amount of unloading and reloading of the compressor.

27. In a motor driven fluid compressor unit having a source of fluid, a motor speed governor regulator comprising movable means actuated by said fluid, means to prevent actuation of the movable means by said fluid, means associated with movable means to transmit movement thereof to the governor, pressure responsive means subject to the discharge pressure of the compressor, means controlled by the pressure responsive means to render the means to prevent actuation of the movable means operative, and means to unload and reload the compressor above a predetermined high pressure comprising means movable in response to variations in the discharge pressure of the compressor, and a valve associated with the last said means to vary the amount of unloading and reloading of the compressor in accordance with movements thereof.

28. In a motor driven fluid compressor unit having a motor speed governor, a pressure responsive device for controlling and varying progressively and degressively the speed setting of the governor in accordance with variations of the discharge pressure of the compressor, means to progressively and degressively unload and reload the compressor in accordance with the discharge pressure of the compressor above a predetermined high discharge pressure comprising a casing having a chamber subject to the discharge pressure of the compressor, movable means responsive to variations of the discharge pressure of the compressor, and a valve associated with the movable means to vary the amount of unloading and reloading of the compressor.

29. In a motor driven fluid compressor unit having a motor speed governor, a pressure responsive device for controlling and varying progressively and degressively the speed setting of the governor in accordance with variations in the discharge pressure of the compressor, means to progressively and degressively unload and reload the compressor in accordance with the discharge pressure of the compressor above a predetermined high discharge pressure comprising movable means responsive to variations in the discharge pressure of the compressor, and a valve associated with the movable means and responsive to movements thereof to vary the amount of unloading and reloading the compressor.

30. In a governor speed regulator for a motor driven compressor comprising a casing having one chamber subjected to the discharge pressure of the compressor and a second chamber subjected to intake manifold pressure for the motor, pressure responsive means in each chamber, means to transmit movement of the pressure responsive means in the second chamber to the governor, means to admit atmosphere to the second chamber, and means actuated by the pressure responsive means in the first said chamber to render the last said means ineffective.

31. In a motor driven fluid compressor, a governor to control the speed of the motor, a pressure responsive device for controlling the characteristics of the governor in accordance with variations of the discharge pressure of the compressor, comprising a casing having a chamber subject to the discharge pressure of the compressor and a second chamber subject to the motor intake manifold pressure, pressure responsive means in each chamber, means to vent the second chamber to atmosphere, means controlled by the pressure responsive means in the first said chamber to render the venting means ineffective upon a predetermined high discharge pressure until a predetermined minimum discharge pressure is reached.

32. In a regulator for a motor driven fluid compressor having a governor and means to progressively and degressively unload and reload the compressor in accordance with variations in the discharge pressure of the compressor, and a pressure responsive device to control the speed setting of the governor in accordance with the variation of the discharge pressure of the compressor having chambers therein, means to vent one of the chambers to atmosphere, and means to close said vent when the discharge pressure of the compressor reaches a predetermined high pressure and maintain it closed until a predetermined minimum pressure is reached.

33. In a regulator for a motor driven compressor having a governor, a casing having a chamber subject to the discharge pressure of the compressor and a second chamber subject to the pressure of the motor intake manifold, pressure responsive means in said chambers, venting means for the second chamber, means associated with pressure responsive means in the other chamber to prevent venting by said venting means when the discharge pressure of the compressor reaches a predetermined high pressure and assure venting by said venting means when the discharge pressure of the compressor reaches a predetermined minimum discharge pressure, adjustable means to regulate the pressures at which said last means operates, and means connected with the pressure responsive means in said second chamber to directly control the governor speed setting.

34. In a regulator for a motor driven fluid compressor having a governor and a receiver to which the compressor discharges, comprising a casing having a chamber in communication with the receiver and a second chamber in communication with the intake manifold of the motor, a diaphragm in the first said chamber, a bellows in said second chamber, a hollow plunger rod connected to the bellows, a vent formed in one end of the plunger rod to open the first said chamber to atmosphere, a plunger associated with the diaphragm, a lever actuated by the plunger, a valve on said lever and controlled thereby to open and close the vent, a series of levers connecting the hollow plunger rod and the governor to vary the speed setting thereof in accordance with the movements of the bellows, and means to predetermine the pressure at which the diaphragm moves the plunger and lever to open and close the vent.

35. In a regulator for a motor driven fluid compressor having a governor, comprising a casing having one chamber subject to the discharge pressure of the compressor and a second chamber subject to the intake manifold pressure of the motor, a diaphragm in the first said chamber movable upon variation in the compressor discharge pressure, a plunger connected with the diaphragm, a bellows in the second chamber, a hollow plunger connected to the bellows, an orifice in the hollow plunger to admit atmospheric air through the plunger to the chamber, a pivotal lever associated with diaphragm plunger adapted to open and close the vent upon variation of the discharge pressure of the compressor, and a series of inter-connecting levers to connect the hollow plunger to the governor whereby the speed setting of the governor may be varied in accordance with the movement of the bellows, and means to admit atmospheric air within the bellows whereby upon closing of the vent the vacuum created by the motor will expand the bellows and maintain the governor at its minimum speed setting position and upon opening of the vent the atmospheric pressure in the chamber will overcome the vacuum of the motor and compress the bellows to move the governor to its maximum speed setting position.

CHARLES S. BAKER.